(12) United States Patent
Vedula

(10) Patent No.: US 8,935,288 B2
(45) Date of Patent: Jan. 13, 2015

(54) USER SPECIFIC LOGS IN MULTI-USER APPLICATIONS

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1421 days.

(21) Appl. No.: 11/747,245

(22) Filed: May 11, 2007

(65) Prior Publication Data

US 2008/0243848 A1 Oct. 2, 2008

(30) Foreign Application Priority Data

Mar. 28, 2007 (IN) .............................. 630/CHE/2007

(51) Int. Cl.
G06F 7/00 (2006.01)
G06F 17/30 (2006.01)
G06F 7/04 (2006.01)
G06F 12/14 (2006.01)
G06F 3/048 (2013.01)

(52) U.S. Cl.
CPC ................................ *G06F 17/30867* (2013.01)
USPC ............... 707/785; 707/783; 707/784; 726/2; 726/21; 726/27; 726/28; 726/29; 726/30; 715/825

(58) Field of Classification Search
CPC ....................................................... G06F 3/0605
USPC ............................................................ 707/672
See application file for complete search history.

(56) References Cited

U.S. PATENT DOCUMENTS

| 5,881,225 A * | 3/1999 | Worth ............................. 726/17 |
| 7,545,784 B2 * | 6/2009 | Mgrdechian et al. .......... 370/338 |
| 2003/0023641 A1 * | 1/2003 | Gorman et al. ................ 707/530 |
| 2003/0028753 A1 * | 2/2003 | Ohishi ........................... 712/205 |
| 2004/0205671 A1 * | 10/2004 | Sukehiro et al. .............. 715/532 |
| 2007/0133037 A1 * | 6/2007 | Arai et al. ..................... 358/1.14 |
| 2007/0174716 A1 * | 7/2007 | Erdtmann et al. .............. 714/39 |

* cited by examiner

*Primary Examiner* — Ajay Bhatia
*Assistant Examiner* — Cheryl M Shechtman
(74) *Attorney, Agent, or Firm* — Narendra Reddy Thappeta (57) ABSTRACT

User specific logs in multi-user applications. Level data associating a user of a multi-user application with a respective log level is received. The multi-user application then records an amount of information determined by the log level corresponding to the user presently using the multi-user application.

16 Claims, 7 Drawing Sheets

```
321: <LogRules>
322:    <LogRule>
323:        <SessionUser> Tim </SessionUser>
324:        <LogLevel> FINE </LogLevel>
325:    </LogRule>
326:    <LogRule>
327:        <SessionUser> John </SessionUser>
328:        <LogLevel> FINEST</LogLevel>
329:    </LogRule>
330: </LogRules>
```

*FIG.3A*

| LoginID 360 | Password 365 | FullName 370 | UserRole 375 |
|---|---|---|---|
| Tim | **** | Tim Duncan | User |
| John | **** | John Malkowich | User |
| Leo | **** | Leo The Lion | User |
| Abraham | **** | Abe Stanley | Moderator |
| Sandy | **** | Sandy Beaches | Administrator |

```
521: class SomeClass {
522:    void someMethod() {
523:        Logger logger = Logger.getLogger("OrderManagemenySystemLog");
524:        logger.setLevel(LogLevel.INFO);
525:        .....
526:        .....
527:        logger.log(LogLevel.ERROR, "Sever Exception in DB");
528:        .....
529:        for (int i = 0; i < 200; i--) {
530:            .....
531:            .....
532:            logger.log(LogLevel.FINE, "Loop variable i is " + i);
533:        }
534:    }
535:}

551: class Logger {
552:    public static Logger getLogger(string name) {
553:        .....
554:        return this;
555:    }
556:    public void log (LogLevel level, Object obj) {
557:        if (level <= this.applicationLevel) {
558:            this.output(obj);
559:        }
560:        else if (UserLogLevel.get() !=null && level <= UserLogLevel.get ()) {
561:            this.output(obj);
562:        }
563:    }
564:    public void setLevel (LogLevel level) {
565:        this.applicationLevel = level;
566:    }
567:    private void output (Object obj) {
568:        PrintWriter out = new PrintWriter (new FileWriter ("log1.txt"));
569:        out.println(getDateTime() + ":" + obj.toString());
570:    }
571:    private LogLevel applicationLevel ;
572: }
```

FIG. 5A

591: 11:30:44 AM, March 15, 2007: Sever Exception in DB.
592: 11:30:46 AM, March 15, 2007: Loop Variable i is 0
593: 11:30:47 AM, March 15, 2007: Loop Variable i is -1

*FIG. 5B*

```
621: public class LogFilterServlet extends GenericServlet {
622:    public void service (ServletRequest request, ServletResponse response) {
623:        LogLevel level = request.getParameter("LogLevel");
624:        if(level == null) {
625:            String userid = request.getParameter("LoginID");
626:            level = findLogLevel(userid);
627:        }
628:        UserLogLevel userLevel = new UserLogLevel(level);
629:    }
630: }

661: public class UserLogLevel extends ThreadLocal {
662:    public UserLogLevel(LogLevel level) {
663:        this.userLevel = level;
664:    }
665:    public static LogLevel get () {
666:        return this.userLevel;
667:    }
668:    protected synchronized Object initialValue() {
669:        return this.userLevel;
670:    }
671:    private LogLevel userLevel ;
672: }
```

USER SPECIFIC LOGS IN MULTI-USER APPLICATIONS

RELATED APPLICATION

The present application is related to and claims priority from the India Patent Application entitled, "User Specific Logs In Multi-User Applications", Serial Number: 630/CHE/2007, Filed: Mar. 28, 2007 naming the same inventors as in the subject patent application, and is incorporated in its entirety herewith.

BACKGROUND

1. Technical Field

The present disclosure relates to software applications and more specifically to providing user specific logs in multi-user applications.

2. Related Art

A multi-user application generally refers to a software program capable of being used by multiple users at the same time. For example, a web application represents a multi-user application that is capable of receiving and processing requests (and send corresponding responses) for different web pages from multiple users simultaneously.

A log refers to information recorded by an application typically related to internal status (e.g., values of variables, the flows, errors occurred, etc.) of execution. Often the information recorded is based on express statements (e.g., print instructions), which are present in the sequence of instructions executed. Logs generally facilitate various maintenance operations (e.g., debugging errors, accounting, etc.) with respect to the multi-user application.

In one embodiment, the amount/type of information recorded in a log depends on a log level, which is applicable to the execution of the entire application for all users. Such a feature may not be adequate in several scenarios.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

According to an aspect of the present invention, level data associating each user of a multi-user application with a respective log level is received. The multi-user application then records an amount of information determined by the log level corresponding to the user presently using the multi-user application. Due to different amounts of information logged for different users, specific amounts of information as desired by each user can be easily provided.

In an embodiment, an application log level applicable to all users of a multi-user application may also be provided. In such a scenario, the log information may be determined based on both the application log level and the log levels corresponding to the users presently using the multi-user application.

According to another aspect of the present invention, a user provides a log level to the multi-user application before requesting for performance of operations. During the performance of the operations, the multi-user application includes in a log an amount of information based on the log level provided by the user.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
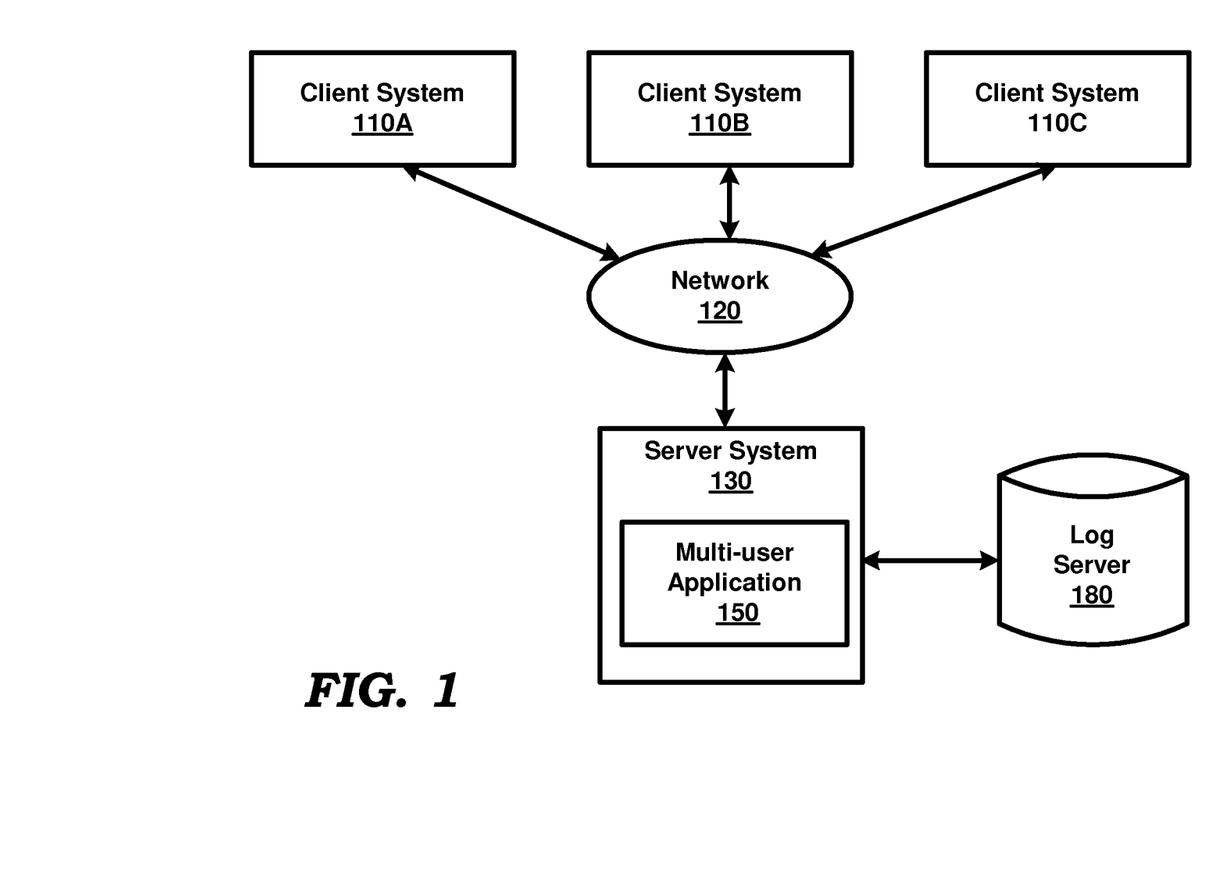
FIG. 1 is a block diagram illustrating an example environment in which various aspects of the present invention can be implemented.

FIG. 1 is a block diagram illustrating an example environment in which various aspects of the present invention can be implemented. The block diagram is shown containing client systems 110A-110C, network 120, server system 130 (executing multi-user application 150) and log server 180. Merely for illustration, only representative number/type of systems is shown in the Figure. Many environments often contain many more systems, both in number and type, depending on the purpose for which the environment is designed. Each system/device of FIG. 1 is described below in further detail.

Network 120 provides connectivity between various client systems 110A-110C and server system 130. Network 120 may be implemented using protocols such as Internet Protocol (IP) well known in the relevant arts.

Each of client systems 110A-110C represents a system such as a personal computer, workstation, mobile station, etc., and is used by a user to generate requests to multi-user application 150 (contained in server system 130). The requests may be generated according to a suitable interface. In general, a client system requests the server system for performing operations (e.g., a transaction or retrieval of a desired content) and receives corresponding responses containing the results of performance of the requested operations.

Server system 130 represents a system, such as a server, which contains software (such as multi-user application 150), which is capable of performing operations requested by client systems 110A-110C. The results of the operations are sent as corresponding responses to the requesting client systems.

Log server 180 facilitates storage and retrieval of log data and may be implemented as a file server or as database server. In one embodiment, log server 180 represents a file server, which stores the log data in a single file, even though the data can be designed to be stored in multiple files.

Multi-user application 150 represents a software program (executing in the environment of server system 130) that is capable of performing operations requested from multiple users at the same time. During the performance of the requested operations, multi-user application 150 may generate output (store/write/display, etc.) related to the functionality for which the application is designed. In addition, multi-user application 150 may record information in log server 180.

In an embodiment, the amount/type of information recorded in a log is dependent on an application log level, which can be one of "WARNING", "INFO", "DEBUG", "FINE", "FINER" (with each level indicating a gradual increase in the amount of information to be recorded) and "FINEST" indicating that most amount of information is to be recorded. The application log level may be applicable to all users using multi-user application 150.

It may be desirable to change the amount of information recorded in a log for specific users. For example, in the scenario, when an error occurs only when the application is used by a few users, it may be desirable to specify a larger log level (thereby recording a larger amount of information) only for the few users who are encountering the error. The larger amount of information recorded may facilitate better/easier debugging of the error. The manner in which information is recorded in logs based on specific users using the multi-user application is described in detail below.

3. Generating User Specific Logs

Figure 2:
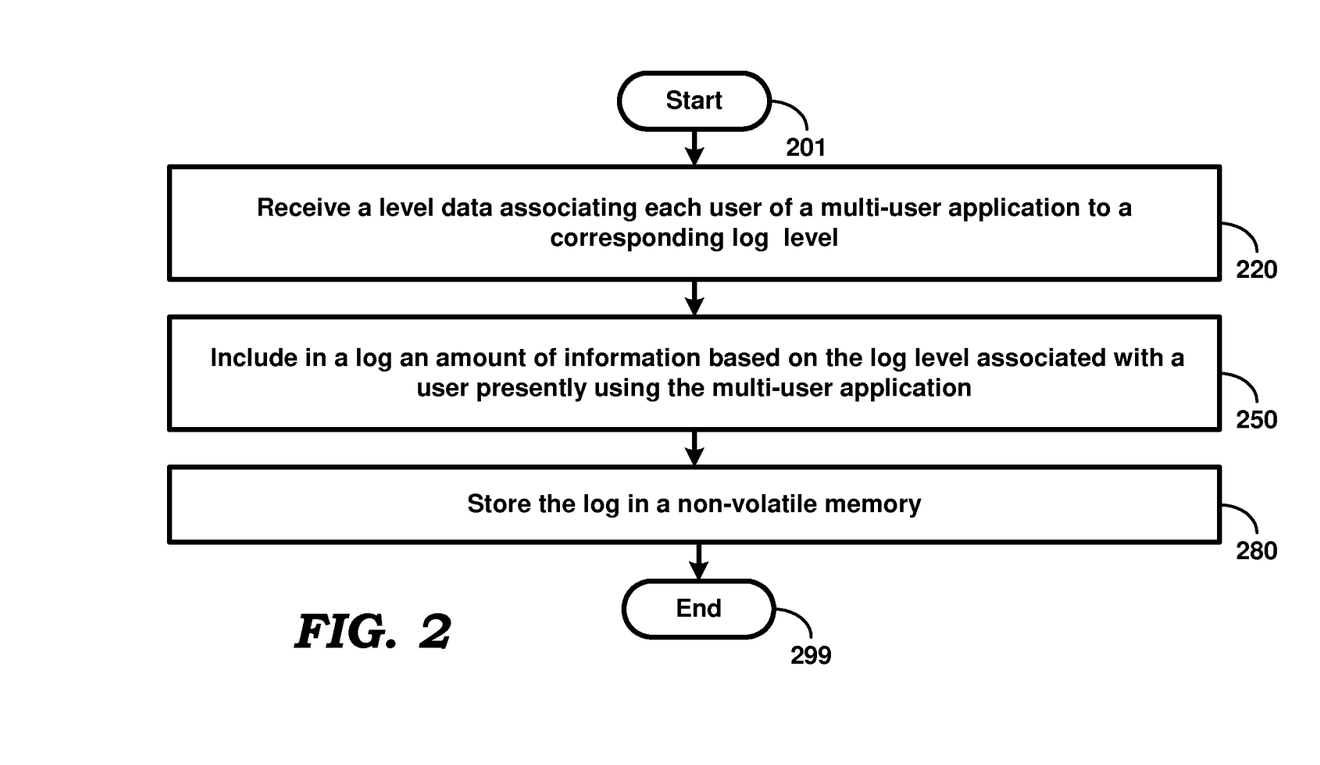
FIG. 2 is a flowchart illustrating the manner in which user specific logs in a multi-user application are generated according to an aspect of the present invention.

FIG. 2 is a flowchart illustrating the manner in which user specific logs in a multi-user application are generated according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein. In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 220.

In step 220, multi-user application 150 receives a level data associating each user of a multi-user application to a corresponding log level. The level data may be received at a time of instantiation of the multi-user application, or dynamically during execution. Similarly, the data may be received from a local non-volatile memory within server system 130, or from externally (e.g., from a client system or external storage). In the embodiments described below, possible values for the user specific log levels are the same as those for the application log level (noted above). However, different set of values can also be provided consistent with the requirements of the specific environment and the multi-user application (and server system 130) can be implemented consistent with such requirements. The log level received corresponding to specific users may be different from the application log level, described above.

In step 250, multi-user application 150 includes in a log for the multi-user application, a first amount of information based on a first log level contained in the set of log levels when multi-user application 150 is used by a corresponding first user. Thus, when a first user (using one of client systems 110A-110C) uses multi-user application 150, the amount of information recorded in the log is based on the corresponding first log level. It may be appreciated that in an alternative embodiment, a combination of the first log level and the application log level may be used for recording information in the log. For users not having a corresponding log level in the received set of log levels, information may be recorded based on the application log level.

In step 280, multi-user application 150 stores the log in a non-volatile memory, e.g., in log server 180 (which is implemented as a file server). The flow chart ends in step 299.

Thus, a user specific log is generated in a multi-user application based on the log level of the specific user. The description is continued illustrating the manner in which log levels corresponding to specific users are specified in an embodiment.

4. Specifying Log Levels

Figure 3A:
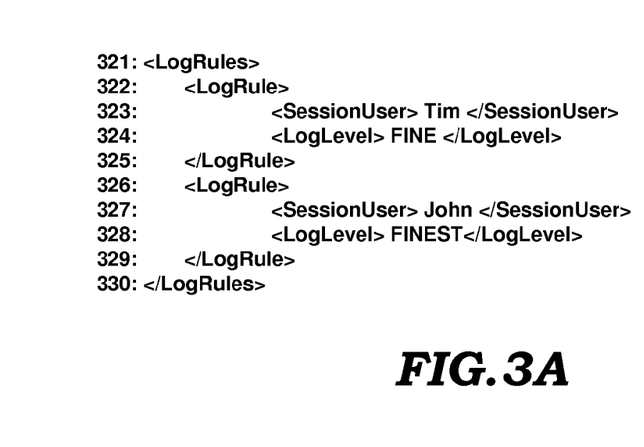
FIG. 3A depicts a portion of level data indicating the log levels corresponding to users using a multi-user application in an embodiment.
Figure 3B:
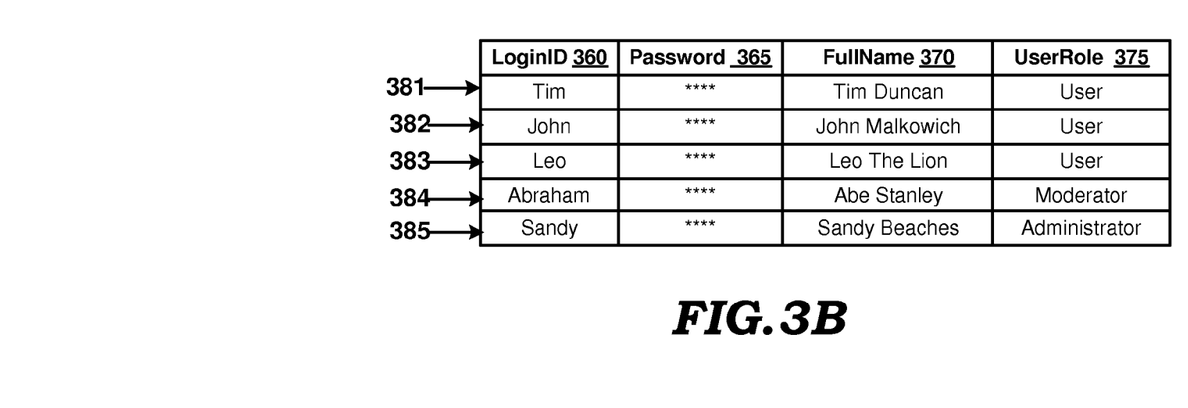
FIG. 3B depicts sample details of users using a multi-user application stored in a table in a database in an embodiment.
Figure 4:
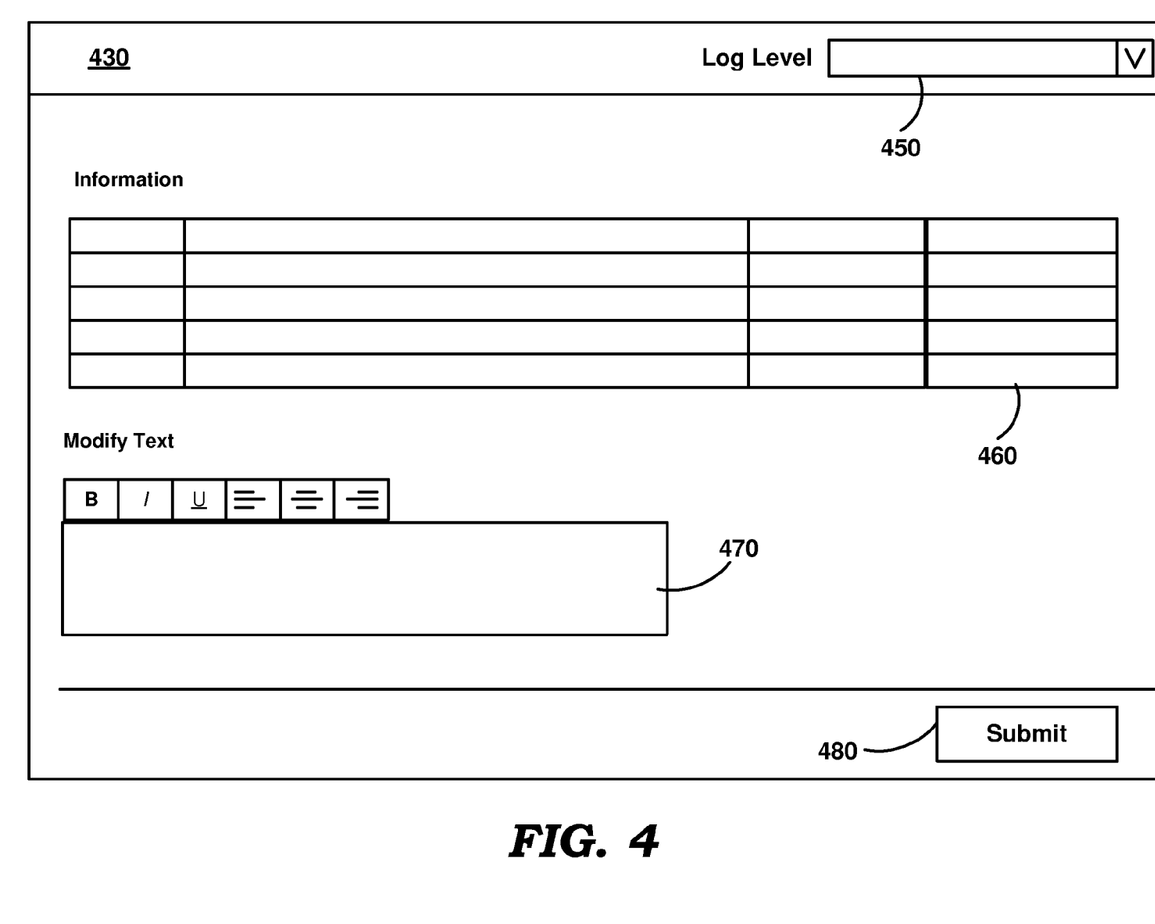
FIG. 4 depicts an example interface enabling a user to provide a log level to a multi-user application in an embodiment.

FIGS. 3A, 3B, and 4 illustrate the manner in which log levels corresponding to specific users are specified in corresponding example embodiments. Each of the Figures is described in detail below.

FIG. 3A depicts a portion of level data indicating the log levels corresponding to users using a multi-user application in an embodiment. Though the content is shown encoded in extensible markup language (XML) according to one convention, other encoding/formats and conventions may be used for representing the log levels.

Broadly, the data is represented in the form of log rules, with each rule indicating a log level to be used corresponding to a user identifier (uniquely identifying each of the users using multi-user application 150). In the scenario, where a user identifier is not present in the log rules, it is assumed that the application log level (assumed to be "INFO") is used to determine the amount of information recorded in the log. Alternatively, when a user identifier is present in a log rule, the corresponding log level specified is used along with the application log level in determining the amount of information to be recorded as described in below sections.

Lines 321-330 (in between tags "<LogRules>" and "</LogRules>") depict the rules to be used in determining the log levels for users using multi-user application 150. In particular, lines 322-325 depict a single log rule specifying that a log level "FINE" be used (as specified between tags "<LogLevel>" and "</LogLevel>" in line 324) for the user identified as "Tim" (as specified between tags "<SessionUser>" and "</SessionUser>" in line 323). Thus, for the user "Tim", the amount of information corresponding to the log level "FINE" is recorded in the log of the multi-user application. Similarly, lines 326-329 depict another log rule specifying a log level of "FINEST" for the user identified as "John".

Thus, the amount of log information recorded for specific users is facilitated by specifying log levels corresponding to the unique identifiers of the specific users of interest. The description is continued depicting the manner in which user information is maintained in an embodiment.

FIG. 3B depicts sample details of users using a multi-user application stored in a table in a database in an embodiment. Column 360 (labeled "LoginID") uniquely identifies each user. Column 365 (labeled "Password") specifies a password (or other authentication information) for each user and is typically stored encrypted in the table. Column 370 (labeled "FullName") specifies the full name of each user. Column 375 (labeled "UserRole") specifies the role of each user in using the multi-user application.

It may be appreciated that the combination of "LoginID" and "Password" for each user may be used to authenticate that a user is allowed to use the multi-user application. Further, the "LoginID" may be used to specify log rules corresponding to specific users (according to the format depicted in FIG. 3A). In the present embodiment, though the "LoginID" is used to specify the log rules in FIG. 3A, it may be appreciated that any value or combination of values (such as "FullName" and "UserRole") that uniquely identifies a user may be used instead of "LoginID".

Row 381 specifies a user with identifier "Tim", encrypted password (shown as "**"), full name "Tim Duncan", and having a user role of "User". It may be observed that the user "Tim" has a corresponding log level "FINE" specified in FIG. 3A (in lines 322-325) indicating the amount of information to be recorded in the log. Similarly lines 382-385 specify other users using the multi-user application. It may be observed that user "John" (in row 382) has a corresponding log level "FINEST" specified in FIG. 3A (in lines 326-329**).

It may be appreciated that for the users other than "Tim" and "John" (for whom log levels "FINE" and "FINEST" have been specified in the log rules), the log information is generated by multi-user application 150 based on the application log level "INFO". Thus, for the users "Tim" and "John", more information is recorded in the log compared to the other users.

It may be further appreciated that log levels may be specified for users independent of the role of the user. As such, a user with a role of "User" may have a log level higher than a user having a role of "Administrator" (representing a system administrator who generally has higher privilege level in operating server system 130). In general, administrators may potentially operate from a console/interface provided at server system 130, while users generally send requests from client systems 110A-110C as described above.

Thus, when a user requests operations to be performed by the multi-user application, the amount of information recorded during the performance of each of the operations is based on the log level corresponding to the user. While the administrator may provide the information of FIG. 3A in the form of a file, it may be desirable that the users be provided enhanced control over the amount of information logged.

An aspect of the present invention enables a user to provide one log level ("log level A") to the multi-user application before requesting for performance of a set of operations. During the performance of the set of operations, the amount of information included in the log is determined by log level A.

After the performance of the set of operations, the user may then provide another log level ("log level B") indicating that further operations be performed with log level B. The amount of information recorded during performance of such further operations is determined by log level B.

Thus, a user is provided enhanced control over the amount/type of information recorded in a log generated by a multi-user application. The description is continued illustrating an interface enabling a user to provide a log level to a multi-user application in an embodiment.

FIG. 4 depicts an example interface enabling a user to provide a log level to a multi-user application in an embodiment. Though the provision of log level and the request for operation is shown together, it may be appreciated that in alternative embodiments, individual interfaces (respectively for specifying the log level and operations) may be provided to a user.

Header 430 represents a portion of the display repeated in the different screens of the interface. The values displayed/selected in header 430 are also repeated in the different screens. Select field 450 (labeled "Log Level") depicts the various log levels provided by the multi-user application. A user may select one of the log levels provided in select field 450. Table 460 and text area 470 represent different interface controls, which may be used by a user to specify various details (such as selecting an operation, specifying the parameters) associated with an operation. On clicking button 480 (labeled "Submit"), a request for an operation is sent to multi-user application 150.

It may be appreciated that the log level selected in select field 450 may also be sent along with the request of performance of an operation. Alternatively, the log level information may be sent independently when the value in select field 450 is changed. Thus, a multi-user application receiving the above information generates log information during the performance of the requested operation based on the selected log level.

The embodiments described above enable the specification of log levels for specific users using a multi-user application. By specifying a log level for a corresponding user, a user specific amount of information may be generated when the multi-user application is used by the corresponding user. The manner in which user specific amount of information is generated by a multi-user application is described in detail below.

5. Generating Log Information

Figure 5A:
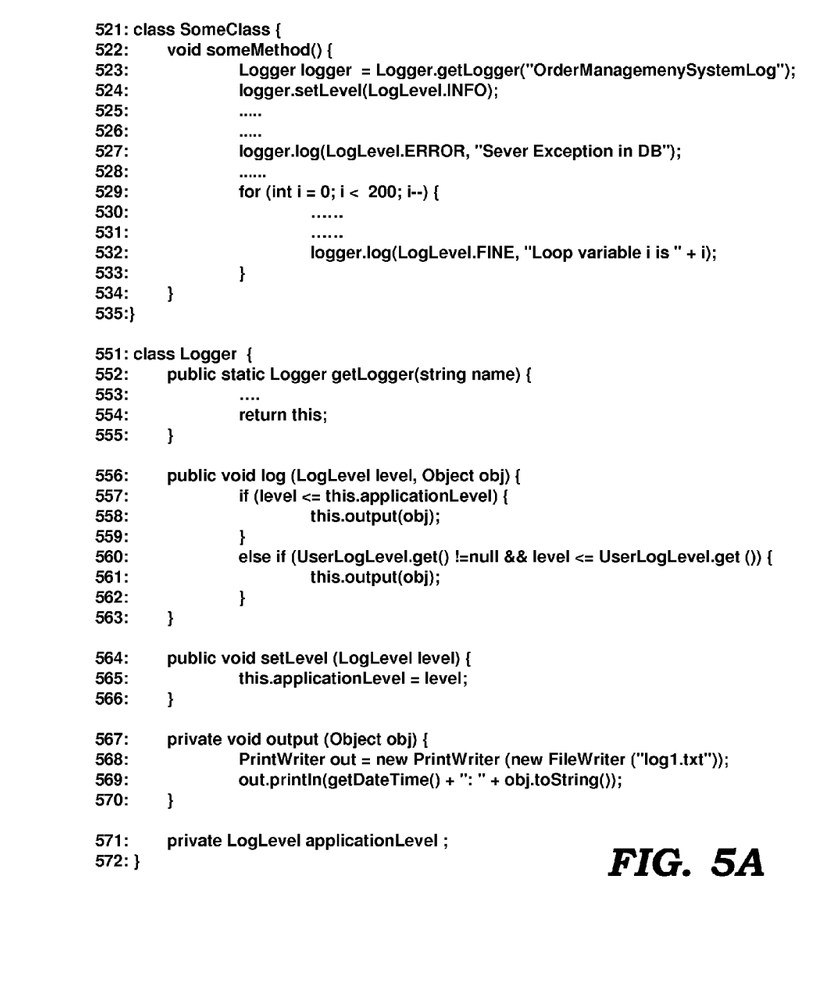
FIG. 5A depicts a portion of software code executed in a multi-user application on receiving a request for performance of an operation from a user in an embodiment.
Figure 5B:
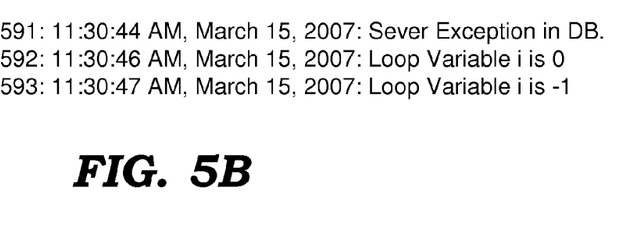
FIG. 5B depicts a portion of log information generated by a multi-user application during the performance of an operation requested by a user in an embodiment.
Figure 6:
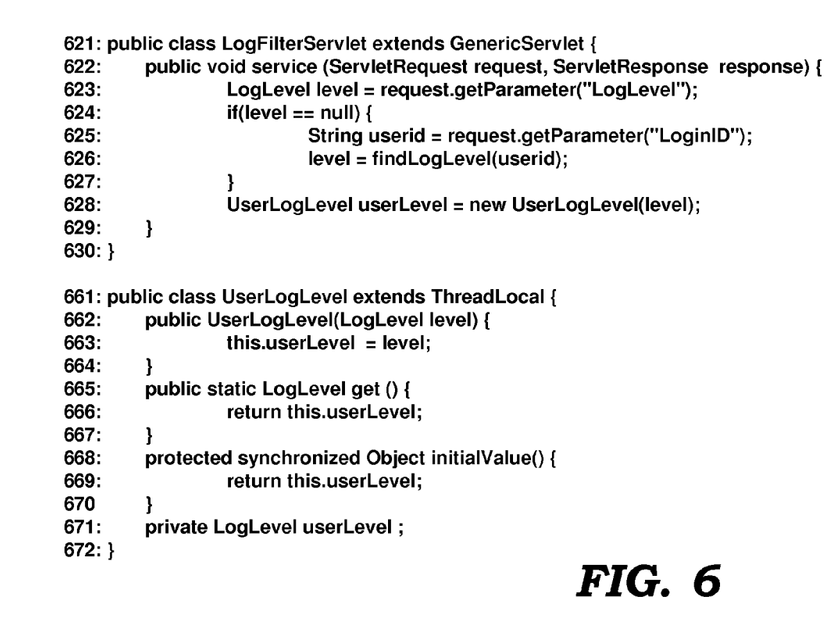
FIG. 6 depicts a portion of software code executed in a multi-user application, enabling the provision of the log level of the present user to software code executed during the performance of requested operations by the multi-user application in an embodiment.

FIGS. 5A, 5B, and 6 together illustrate the manner in which user specific amount of information is recorded in a log by a multi-user application in an embodiment.

Broadly, information is added to a log in a multi-user application by incorporating explicit logging instructions (in the software code constituting the multi-user application) specifying the information to be added. In order to avoid excess/unwanted information being added to the log, each logging instruction may specify a corresponding log level. In the scenario where the log levels associated with a logging instruction is not greater than the application log level, the corresponding information in the logging instruction is included in the log and excluded otherwise. Thus, the amount of information that is included/recorded in the log may be controlled by choosing the appropriate log level.

FIG. 5A depicts a portion of software code executed in a multi-user application on receiving a request for performance of an operation from a user in an embodiment. Though the instructions of the software code (in FIG. 6 as well) are shown in Java™ language, it should be appreciated that the features can be implemented in other environments and programming languages.

Lines 521-535 specify a class "SomeClass" with a function "someMethod" (in lines 522-534) that may be executed in multi-user application 150 when a request for an operation is received from a user (using one of client systems 110A-110C). The function can be implemented to provide any utility, though the details are not provided to avoid obscuring the features sought to be described.

In line 523, variable "logger" is initialized with an instance of the "Logger" class identified by the name "OrderManagementSystemLog". The "Logger" class provides various functions for generating a log as described in detail below. In line 524, the function "setLevel" provided in the "Logger" class is used to set the application log level to "INFO".

Each of lines 527 and 532 depicts explicit logging instructions to add information (provided as a function "log" of the "Logger" class) to a log. In line 527, the logging instruction specifies a corresponding log level "ERROR" and information "Server Exception in DB" to be included in the log. Since the log level "ERROR" of the logging instruction is less than the application log level "INFO", the corresponding information is included in the log for all users.

In line 532, the logging instruction has a log level of "FINE" (greater than application log level "INFO") and therefore the corresponding information "Loop variable i is" (concatenated with the actual value of variable "i") is not include in the log for users not specified in the log rules (of FIG. 3A). It may be appreciated that even when a user is specified in the log rules, the information is included in the log only when the log level of the logging instruction is not greater than the log level specified corresponding to the user.

For a user such as "Tim" having a user specific log level of "FINE" (as specified in the log rules of FIG. 3A), the corresponding information is included in the log since the log level "FINE" is not greater than the user specific log level "FINE". It may be appreciated that lines 529-533 represent a loop that will be executed twice with variable "i" taking the values of "0" and "−1". As such, the logging instruction in line 532 is executed twice, and information is included in the log twice for users such as "Tim".

Lines 551-572 specify a class "Logger" providing various functions to generate a log for a multi-user application. Lines 552-555 specify a function "getLogger" which enables an instance of the "Logger" class to be generated. Lines 564-566 specify a function "setLevel" which enables an application log level to be specified. The application log level specified is stored in the internal variable "applicationLevel" (specified in line 571).

Lines 567-570 specify an internal function "output" which writes the log information specified (parameter "obj") to a file (named "log1.txt"). It may be observed that the function "output" appends the current date and time (retrieved using the function "getDateTime" not shown) to the log information before adding to the file.

Lines 556-563 specify a function (i.e., logging instruction) "log" enabling information to be included in the log. The function accepts two parameters with the first parameter "level" indicating the log level associated with the logging instruction and the second parameter "obj" specifying the log information to be included in the log.

Each of lines 558 and 561 calls the function "output" with the second parameter "obj", thereby including the log information in the log. Line 558 is executed only when the first parameter "level" is not greater than the "applicationLevel", for example, during the call to the function "log" in line 527. Lines 560-562 are executed only in the scenario that the parameter "level" is greater than the "applicationLevel".

Further, line 561 is executed only when a user specific log level is specified (as determined by checking that "UserLogLevel.get( )" is not a "null" value as depicted in line 560) and that the parameter "level" is not greater than the user specific log level "UserLogLevel.get( )" (as depicted in line 560). Line 561 may be executed during the calls to the function "log" in line 532 for a user such as "Tim" having a user specific log level of "FINE".

In one embodiment, the user specific log level is provided to the "Logger" class using a thread local variable "UserLogLevel" as described in detail in relation to FIG. 6. Alternatively, the user specific log level may be provided to the "Logger" class using techniques such as session/application variables well known in the relevant arts.

Thus, the various logging instructions (calls to the function "log" of the "Logger" class) are executed, the logging instructions having log levels not greater than the application/user specific log level are identified and the corresponding information included in the log generated by the multi-user application. The description is continued illustrating a log generated by the execution of logging instructions in an example embodiment.

6. Log Information

FIG. 5B depicts a portion of log information generated by a multi-user application during the performance of an operation requested by a user in an embodiment. It may be appreciated that the log information is generated during the execution of the portion of software code depicted in FIG. 5A. The log information depicted may be stored in log server 180. Though shown in a specific format, it may be appreciated that the log information may be generated/stored in any convenient format.

Lines 591-593 depict information included in the log during the execution of logging instructions in a software code (as depicted in FIG. 5A). Thus, line 591 is included in the log on execution of the logging instruction (with log level "FINE") depicted in line 527. Lines 592 and 593 represent information included in the log on the execution (twice) of the logging instruction depicted in line 532.

It may be observed that in line 593, the value of the loop variable "i" becomes negative indicating to a user that there may be a potential bug (that is, a decrement operator used instead of a an increment operator) in the loop instructions depicted in lines 529-533. It may be appreciated that lines 591-593 are included in a log for a user having a user specific log level not less than "FINE" (such as user "Time"), enabling such users to quickly identify the above bug.

On the other hand, for users not specified in a log rule in FIG. 3A (or having a log level less than "FINE", the log level associated with the logging instruction of line 532), the log generated by the multi-user application would include only line 591, thereby making it difficult for such a user to identify the above bug.

It may be appreciated that to enable the logging of above information, it may be necessary that the software code executed during the performance of a requested operation be provided with the log level of the present user. The manner in which the log level of the present user may be provided to software code executed during performance of operations is described in detail below.

7. Providing Log Level of Present User

FIG. 6 depicts a portion of software code executed in a multi-user application, enabling the provision of the log level of the present user to software code executed during the performance of requested operations by the multi-user application in an embodiment.

Broadly, a multi-user application on receiving multiple requests (specifying different operations) from different users, executes each of the requests (the software code corresponding to the specified operation) as separate threads (in general, an execution entity which receives processing resources independently), which can execute simultaneously.

Lines 621-630 specify a class "LogFilterServlet" with a function "service" (in lines 622-629) that may be executed in multi-user application 150 (in the same thread) prior to execution of software code corresponding to an operation requested by a user. The function "service" is initially executed by multi-user application 150 with the parameter "request" specifying the various data (such as log level, user identifier etc.) sent by and/or related to the user requesting the performance of an operation.

In line 623, a variable "level" is assigned the user specific log level specified in the request. Such a user specific log level may be specified by a user (and sent in the request along with a desired operation) using appropriate interfaces such as the interface depicted in FIG. 4. In the scenario that the request does not contain a user specific log level a "null" value is assigned to the variable "level". In line 624, the value of variable "level" is compared with the value "null".

As such, lines 625 and 626 are executed only in the scenario when the request does not contain a user specific log level. In line 625, a variable "userid" is assigned the identifier ("LoginID") of the present user retrieved from the request. Such information about the users using multi-user application 150 may be maintained by the application (in server system 130 or in client systems 110A-110C) and may be added to each request received from the corresponding user. Multi-user application 150 may identify each user using the IP address of the user or by maintaining identification information in the client systems used by the users to generate requests.

In line 626, the variable "level" is assigned the user specific log level retrieved from level data by calling a function "findLogLevel" with the value of the variable "userid" specified as a parameter of the function. In one embodiment, the function "findLogLevel" accepts the user identifier as a parameter, reads the level data information from an XML file (as depicted in FIG. 3A) and returns the log level corresponding to the user identifier. In the scenario that a user does not have a log level specified in the level data, the function "findLogLevel" returns a "null" value, which is then assigned to the variable "level".

In line 628, a new thread local variable with name "UserLogLevel" is created with the initial value specified as the value of the variable "level". Thus, the user specific log level is retrieved (either from the request or from the level data) and stored in a thread local variable. It may be observed that in the scenario that a user specific log level is not specified either in the request or in the level data, the value of the variable "UserLogLevel" is set to a "null" value. By checking for a "null" value for the variable "UserLogLevel" in the software code executed for the performance of a requested operation, the software code may determine the absence of a user specific log level and may use the application log level for generating log information.

It may be appreciated that a thread local variable enables different portions of software code executed in a single thread to share information among the different portions. The description is continued illustrating an example implementation of a thread local variable.

Lines 661-672 specify a class "UserLogLevel" extending a library class "ThreadLocal" and providing the functions required to define a thread local variable (with the functions being determined by the library class). Lines 662-664 specify a function "UserLogLevel" which creates an instance of the "UserLogLevel" class with the corresponding log level specified as parameter "level". The value of the parameter "level" is stored in the internal variable "userLevel" (specified in line 671).

Lines 665-667 specify a function "get" which returns the user log level set during the creation of an instance of the class. Lines 668-670 specify an internal function "initialValue" which is executed when other instances of the variable are created. It may be observed that the function "intialValue" returns the value of the user log level, thereby ensuring that all instance of the thread local variable have the same value for the user log level.

It should further be appreciated that multi-user application 150 may be implemented in a combination of one or more of hardware, software and firmware. The description is continued with respect to an embodiment in which various features are operative by execution of corresponding software instructions.

8. Digital Processing System

Figure 7:
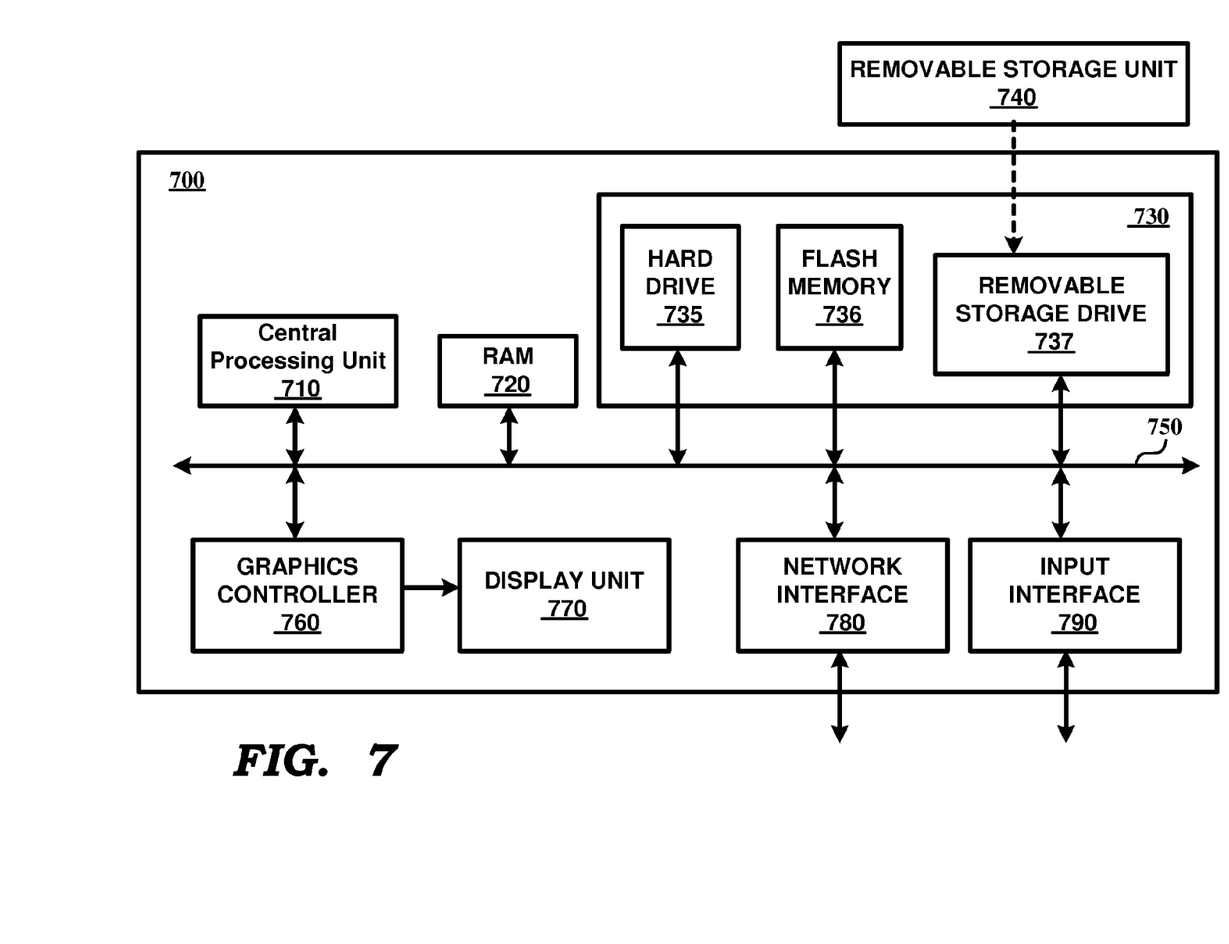
FIG. 7 is a block diagram illustrating the details of a digital processing system in which various aspects of the present invention are operative by execution of appropriate software instructions.

FIG. 7 is a block diagram illustrating the details of digital processing system 700 in which various aspects of the present invention are operative by execution of appropriate software instructions. Digital processing system 700 may correspond to server system 130 (executing multi-user application 150). Digital processing system 700 may contain one or more processors (such as a central processing unit (CPU) 710), random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general purpose processing unit. RAM 720 may receive instructions from secondary memory 730 using communication path 750.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse). Network interface 780 provides connectivity to a network (e.g., using Internet Protocol), and may be used to communicate with others connected systems (such as client systems 110A-110C) of FIG. 1.

Secondary memory 730 may contain hard drive 735, flash memory 736, and removable storage drive 737. Secondary memory 730 may store the data (e.g., portions of data depicted in FIGS. 3A and 3B) and software instructions (e.g., portions of software module depicted in FIGS. 5A and 6), which enable system 700 to provide several features in accordance with the present invention. Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of generating a log for a multi-user application, said multi-user application being used by a plurality of users, said method comprising:
   maintaining level data indicating association of each of said plurality of users with a respective log level of a plurality of log levels, wherein said level data associates a first log level with a first user and a second log level with a second user, wherein said first user and said second user are contained in said plurality of users, and wherein said first log level and said second log level are contained in said plurality of log levels;
   receiving a first request from said first user and a second request from said second user, wherein said first request and said second request are for a same operation, and are received when said level data associates said first log level with said first user and said second log level with said second user;
   executing a software code constituting said multi-user application for both of said first user and said second user in a server system such that said first request and said second request for said same operation are processed by said multi-user application executing in said server system;
   determining whether any specific log level is indicated as a part of said first request and said second request, wherein said determining determines that said second request indicates a third log level, and said first request does not indicate any specific log level; and
   including, by said multi-user application, in said log a first amount of information based on said first log level when said software code is executed in said server system for processing said first request for said same operation received from said first user, and a second amount of information based on said third log level when said software code is executed in said server system for processing said second request for said same operation received from said second user.

2. The method of claim 1, wherein said multi-user application is associated with an application log level as a default log level indicating another amount of information to be recorded for all of said plurality of users,
   wherein said including includes in said log a default amount of information corresponding to said default log level for all of said plurality of users,
   wherein additional amount of information, in addition to said default amount of information, is included for said first user only if said first log level specifies more detail of information is to be logged compared to said default log level.

3. The method of claim 1, further comprising storing said first amount of information and said second amount of information in a non-volatile memory.

4. The method of claim 3, wherein said receiving receives a plurality of identifiers, each identifier identifying a respective user of a plurality of users.

5. The method of claim 1, wherein said first request is processed in a first thread and said second request is processed in a second thread of said multi-user application, wherein said first thread and said second thread operate to cause said first request and said second request to be processed simultaneously.

6. The method of claim 1, wherein said receiving receives from a client system, data representing a fourth log level as said specific log level for a fourth user and a fourth operation, both of said fourth log level and said fourth operation being received as a single submission in the form of a fourth request from said client system to said multi-user application executing in said server system,
   wherein said fourth request is generated and sent from said client system as said single submission upon said fourth user specifying and submitting a combination of said fourth operation and said fourth log level in a user interface provided on said client system,
   the receipt of said fourth log level with said fourth operation in said fourth request indicating that the amount of information to be recorded in said log is to correspond to said fourth log level when performing said fourth operation in said server system,
   wherein said multi-user application performs said fourth operation in response to receiving of said fourth request,
   wherein said determining determines that said fourth request indicates said fourth log level,
   wherein said including, includes in said log a fourth amount of information based on said fourth log level when performing said fourth operation in response to receipt of said fourth request, said fourth amount of information being included in said log as a response to receipt of said fourth log level with said fourth operation in said fourth request
   wherein said receiving further receives from said client system, data representing a fifth log level as said specific log level for said fourth user and said fourth operation again as a single submission in the form of a fifth request to said multi-user application executing in said server system,
   wherein said fifth request is generated and sent from said client system as said single submission upon said user specifying and submitting a combination of said fourth operation and said fifth log level in a user interface provided on said client system,
   the receipt of said fifth log level with said fourth operation in said fifth request indicating that amount of information to be recorded in said log is to correspond to said fifth log level when performing said fourth operation in said server system, wherein said multi-user application performs said fourth operation in response to receiving of said fifth request, wherein said determining determines that said fifth request indicates said fifth log level, wherein said including includes in said log a fifth amount of information based on said fifth log level when performing said fourth operation in response to receipt of said fifth request, said fifth amount of information being included in said log as a response to receipt of said fifth log level with said fourth operation in said fifth request, wherein said fourth amount of information is not identical to said fifth amount of information when said fourth log level is not equal to said fifth log level.

7. A non-transitory machine readable medium carrying one or more sequences of instructions for causing a system to generate a log for a multi-user application, said multi-user application being used by a plurality of users, wherein execution of said one or more sequences of instructions by one or more processors contained in said system causes said system to perform the actions of:

maintaining level data indicating association of each of said plurality of users with a respective log level of a plurality of log levels, wherein said level data associates a first log level with a first user and a second log level with a second user, wherein said first user and said second user are contained in said plurality of users, and wherein said first log level and said second log level are contained in said plurality of log levels;

receiving a first request from said first user and a second request from said second user, wherein said first request and said second request are for a same operation, and are received when said level data associates said first log level with said first user and said second log level with said second user;

executing a software code constituting said multi-user application for both of said first user and said second user in a server system such that said first request and said second request for said same operation are processed by said multi-user application executing in said server system;

determining whether any specific log level is indicated as a part of said first request and said second request, wherein said determining determines that said second request indicates a third log level, and said first request does not indicate any specific log level; and including, by said multi-user application, in said log a first amount of information based on said first log level when said software code is executed in said server system for processing said first request for said same operation received from said first user, and a second amount of information based on said third log level when said software code is executed in said server system for processing said second request for said same operation received from said second user.

8. The non-transitory machine readable medium of claim 7, wherein said multi-user application is associated with an application log level as a default log level indicating another amount of information to be recorded for all of said plurality of users, wherein said including includes in said log a default amount of information corresponding to said default log level for all of said plurality of users, wherein additional amount of information, in addition to said default amount of information, is included for said first user only if said first log level specifies more detail of information is to be logged compared to said default log level.

9. The non-transitory machine readable medium of claim 7, further comprising one or more instructions for storing said first amount of information and said second amount of information in a non-volatile memory.

10. The non-transitory machine readable medium of claim 7, wherein said receiving receives from a client system, data representing a fourth log level as said specific log level for a fourth user and a fourth operation, both of said fourth log level and said fourth operation being received as a single submission in the form of a fourth request from said client system to said multi-user application executing in said server system, wherein said fourth request is generated and sent from said client system as said single submission upon said fourth user specifying and submitting a combination of said fourth operation and said fourth log level in a user interface provided on said client system, the receipt of said fourth log level with said fourth operation in said fourth request indicating that the amount of information to be recorded in said log is to correspond to said fourth log level when performing said fourth operation in said server system, wherein said multi-user application performs said fourth operation in response to receiving of said fourth request, wherein said determining determines that said fourth request indicates said fourth log level, wherein said including, includes in said log a fourth amount of information based on said fourth log level when performing said fourth operation in response to receipt of said fourth request, said fourth amount of information being included in said log as a response to receipt of said fourth log level with said fourth operation in said fourth request wherein said receiving further receives from said client system, data representing a fifth log level as said specific log level for said fourth user and said fourth operation again as a single submission in the form of a fifth request to said multi-user application executing in said server system, wherein said fifth request is generated and sent from said client system as said single submission upon said user specifying and submitting a combination of said fourth operation and said fifth log level in a user interface provided on said client system, the receipt of said fifth log level with said fourth operation in said fifth request indicating that amount of information to be recorded in said log is to correspond to said fifth log level when performing said fourth operation in said server system, wherein said multi-user application performs said fourth operation in response to receiving of said fifth request, wherein said determining determines that said fifth request indicates said fifth log level, wherein said including includes in said log a fifth amount of information based on said fifth log level when performing said fourth operation in response to receipt of said fifth request, said fifth amount of information being included in said log as a response to receipt of said fifth log level with said fourth operation in said fifth request, wherein said fourth amount of information is not identical to said fifth amount of information when said fourth log level is not equal to said fifth log level.

11. A digital processing system generating a log for a multi-user application, said multi-user application being used by a plurality of users, said digital processing system comprising:
a processor;
a random access memory (RAM); and
a machine readable medium to store a set of instructions which when retrieved into said RAM and executed by said processor is designed to cause said digital processing system to perform the actions of:
maintaining level data indicating association of each of said plurality of users with a respective log level of a plurality of log levels, wherein said level data associates a first log level with a first user and a second log level with a second user, wherein said first user and said second user are contained in said plurality of users, and wherein said first log level and said second log level are contained in said plurality of log levels;
receiving a first request from said first user and a second request from said second user, wherein said first request and said second request are for a same operation, and are received when said level data associates said first log level with said first user and said second log level with said second user;
executing a software code constituting said multi-user application for both of said first user and said second user in a server system such that said first request and said second request for said same operation are processed by said multi-user application executing in said server system;
determining whether any specific log level is indicated as a part of said first request and said second request, wherein said determining determines that said second request indicates a third log level, and said first request does not indicate any specific log level; and
including, by said multi-user application, in said log a first amount of information based on said first log level when said software code is executed in said server system for processing said first request for said same operation received from said first user, and a second amount of information based on said third log level when said software code is executed in said server system for processing said second request for said same operation received from said second user.

12. The digital processing system of claim 11, wherein said multi-user application is associated with an application log level as a default log level indicating another amount of information to be recorded for all of said plurality of users,
wherein said digital processing system includes in said log a default amount of information corresponding to said default log level for all of said plurality of users,
wherein additional amount of information, in addition to said default amount of information, is included for said first user only if said first log level specifies more detail of information is to be logged compared to said default log level.

13. The digital processing system of claim 12, further performing the actions of storing said first amount of information and said second amount of information in a non-volatile memory.

14. The digital processing system of claim 11, wherein said digital processing system receives from a client system, data representing a fourth log level as said specific log level for a fourth user and a fourth operation, both of said fourth log level and said fourth operation being received as a single submission in the form of a fourth request from said client system to said multi-user application executing in said server system,
wherein said fourth request is generated and sent from said client system as said single submission upon said fourth user specifying and submitting a combination of said fourth operation and said fourth log level in a user interface provided on said client system,
the receipt of said fourth log level with said fourth operation in said fourth request indicating that the amount of information to be recorded in said log is to correspond to said fourth log level when performing said fourth operation in said server system,
wherein said multi-user application performs said fourth operation in response to receiving of said fourth request,
wherein digital processing system determines that said fourth request indicates said fourth log level,
wherein said digital processing system includes in said log a fourth amount of information based on said fourth log level when performing said fourth operation in response to receipt of said fourth request, said fourth amount of information being included in said log as a response to receipt of said fourth log level with said fourth operation in said fourth request
wherein said digital processing system further receives from said client system, data representing a fifth log level as said specific log level for said fourth user and said fourth operation again as a single submission in the form of a fifth request to said multi-user application executing in said server system,
wherein said fifth request is generated and sent from said client system as said single submission upon said user specifying and submitting a combination of said fourth operation and said fifth log level in a user interface provided on said client system,
the receipt of said fifth log level with said fourth operation in said fifth request indicating that amount of information to be recorded in said log is to correspond to said fifth log level when performing said fourth operation in said server system,
wherein said multi-user application performs said fourth operation in response to receiving of said fifth request,
wherein digital processing system determines that said fifth request indicates said fifth log level,
wherein said digital processing system includes in said log a fifth amount of information based on said fifth log level when performing said fourth operation in response to receipt of said fifth request, said fifth amount of information being included in said log as a response to receipt of said fifth log level with said fourth operation in said fifth request,
wherein said fourth amount of information is not identical to said fifth amount of information when said fourth log level is not equal to said fifth log level.

15. A set of systems comprising:
a client system operable to:
provide a user interface in the form of an individual screen on a display unit, said individual screen containing a first field and a second field, said first field being for specifying a desired log level and said second field being for specifying a desired operation to be performed by a multi-user application, said individual screen to facilitate said user to specify and submit a combination of said desired operation and said desired log level together as a single request;
in response to said user specifying and submitting in said individual screen of said user interface a first operation as said desired operation in said second field, and a first log level as said desired log level in said first field, send data representing said first log level and said first operation as a part of a first request to a multi-user application; and in response to said user specifying and submitting in said individual screen of said user interface said first operation as said desired operation and a second log level as said desired log level, send data representing said second log level and said first operation as a part of a second request to said multi-user application, wherein both of said first log level and said first operation are sent as a single submission to represent said first request, wherein both of said second log level and said first operation are also sent as a single submission to represent said second request; and a server system executing said multi-user application, said server system operable to:

receive said first request and then said second request from said client system; and include in a log a first amount of information based on said first log level when performing said first operation as a part of processing of said first request using said multi-user application and then a second amount of information based on said second log level when performing said first operation as a part of processing of said second request using said multi-user application, wherein said first amount of information is not identical to said second amount of information when said first log level is not equal to said second log level, whereby said user is provided control over the information recorded in said log by said multi-user application executing in said server system.

16. A non-transitory machine readable medium carrying one or more sequences of instructions for causing a client system to provide control to a user over the information recorded in a log generated by a multi-user application executing in a server system, wherein execution of said one or more sequences of instructions by one or more processors contained in said client system causes said client system to perform the actions of:

providing a user interface in the form of an individual screen on a display unit, said individual screen containing a first field and a second field, said first field being for specifying a desired log level and said second field being for specifying a desired operation to be performed by a multi-user application, said individual screen to facilitate said user to specify and submit a combination of said desired operation and said desired log level together as a single request;

in response to said user specifying and submitting in said individual screen of said user interface a first operation as said desired operation in said second field, and a first log level as said desired log level in said first field, send data representing said first log level and said first operation as a part of a first request to a multi-user application; and in response to said user specifying and submitting in said individual screen of said user interface said first operation as said desired operation and a second log level as said desired log level, send data representing said second log level and said first operation as a part of a second request to said multi-user application, wherein both of said first log level and said first operation are sent as a single submission to represent said first request, wherein both of said second log level and said first operation are also sent as a single submission to represent said second request, wherein said server system executing said multi-user application receives said first request and then said second request from said client system, wherein said server system includes in a log a first amount of information based on said first log level when performing said first operation as a part of processing of said first request using said multi-user application and then a second amount of information based on said second log level when performing said first operation as a part of processing of said second request using said multi-user application, wherein said first amount of information is not identical to said second amount of information when said first log level is not equal to said second log level, whereby said user is provided control over the information recorded in said log by said multi-user application executing in said server system.

* * * * *

UNITED STATES PATENT AND TRADEMARK OFFICE
CERTIFICATE OF CORRECTION

| | | |
|---|---|---|
| PATENT NO. | : 8,935,288 B2 | Page 1 of 1 |
| APPLICATION NO. | : 11/747245 | |
| DATED | : January 13, 2015 | |
| INVENTOR(S) | : Vedula | |

It is certified that error appears in the above-identified patent and that said Letters Patent is hereby corrected as shown below:

In the Specification

In column 8, line 45, delete "a an" and insert -- an --, therefor.

Signed and Sealed this
Eighth Day of September, 2015

Michelle K. Lee
*Director of the United States Patent and Trademark Office*